United States Patent [19]
Ishii et al.

[11] Patent Number: 5,396,340
[45] Date of Patent: Mar. 7, 1995

[54] OPTICAL DISC REPRODUCING APPARATUS HAVING DISPLAYING MADE CONTROL KEY FUNCTIONS

[75] Inventors: Toshiyuki Ishii; Kousuke Misono; Hideki Matsumoto, all of Kanagawa, Japan

[73] Assignee: Sony Corporation, Tokyo, Japan

[21] Appl. No.: 32,421

[22] Filed: Mar. 15, 1993

Related U.S. Application Data

[63] Continuation of Ser. No. 764,179, Sep. 23, 1991, abandoned.

[30] Foreign Application Priority Data

Oct. 1, 1990 [JP] Japan ................... 2-263471

[51] Int. Cl.6 .................. H04N 5/76; H04N 5/781
[52] U.S. Cl. ................... 358/342; 348/838; 358/335; 369/32; 360/33.1
[58] Field of Search ............... 358/335, 342, 310, 312, 358/254, 22; 360/10.1, 14.1, 14.2, 33.1; 369/32, 47, 58; 340/701–712; H04N 5/76, 781; 348/836, 838

[56] References Cited

U.S. PATENT DOCUMENTS

| | | | |
|---|---|---|---|
| 4,475,132 | 10/1984 | Rodesch | 358/342 |
| 4,633,323 | 12/1986 | Haberkern et al. | 358/254 |
| 4,635,110 | 1/1987 | Weinblatt | 358/254 |
| 4,667,299 | 5/1987 | Dunn | 364/708 |
| 4,706,117 | 11/1987 | Schoolman | 358/342 |
| 4,772,962 | 9/1988 | Tanaka et al. | 369/32 |
| 4,803,560 | 2/1989 | Matsunaga et al. | 358/254 |
| 4,893,193 | 1/1990 | Nakamura et al. | 358/342 |
| 4,908,612 | 3/1990 | Bromley et al. | 340/706 |
| 4,963,994 | 10/1990 | Levine | 358/335 |
| 5,157,511 | 10/1992 | Kawai et al. | 358/342 |
| 5,214,514 | 5/1993 | Haberkern | 358/335 |

FOREIGN PATENT DOCUMENTS

| | | | |
|---|---|---|---|
| 0389261A2 | 9/1990 | European Pat. Off. | G11B 31/00 |
| 0390041A2 | 10/1990 | European Pat. Off. | H04B 1/20 |
| 0436877 | 7/1991 | European Pat. Off. | |
| 61-58024 | 3/1986 | Japan | G06F 3/02 |

OTHER PUBLICATIONS

IEEE Transactions on Consumer Electronics, vol. 34, No. 3, Aug. 1988, New York, US, pp. 814–818, G. Zeisel et al.: "An Interactive Menu–driven Remote Control Unit for TV-received and VC-recorders."
Funkschau, vol. 60, No. 18, 26 Aug. 1988, Munchen DE, pp. 36–39, P. Kaiser: "Faszination Compact Disc."
British Kinematography Sound and Television Society Journal, vol. 67, No. 7, Jul. 1985, London, Great Britain, pp. 426–430; R. Simpson: "The Application of Video Discs to Exhibitions, Museums and Displays."

Primary Examiner—Tommy P. Chin
Assistant Examiner—Khoi Truong
Attorney, Agent, or Firm—Limbach & Limbach

[57] ABSTRACT

A disc reproducing apparatus for reproducing video image data and audio data recorded on a disc wherein control operation icons are displayed on the same display screen for displaying the reproduced video image and the operations represented by the displayed icons may be selected by the user of the apparatus by activating separate operation keys corresponding to the displayed icons.

6 Claims, 8 Drawing Sheets

71

5,396,340

OPTICAL DISC REPRODUCING APPARATUS HAVING DISPLAYING MADE CONTROL KEY FUNCTIONS

This is a continuation of application Ser. No. 07/764,179, filed on Sep. 23, 1991, now abandoned.

BACKGROUND OF THE INVENTION Field of the Invention

The invention relates to a disc reproducing apparatus which can reproduce a CD-I disc on which image data and the like in addition to audio data are recorded.

2. Description of the Prior Art

There has been proposed a CD-I (CD Interactive) system in which image data (natural image, animation, computer graphics, etc.), text data, program data, and the like in addition to audio data are recorded onto a CD (Compact Disc) and which can execute the operation in an interactive manner. Since such a CD-I system has a reproducing function of characters, images, audio data, computer data, etc., it can be used in AV industrial apparatuses mainly for the purpose of audio and video fields, electronic publishing which mainly handles characters, data base services mainly comprising information files, education and amusement which are mainly executed by interactive responses, and the like. Thus, the CD-I system is expected as a medium of a new format.

In the CD-I system, various data specifications are predetermined so that it can widely be spread as a home-use system while keeping a compatibility. That is, in the CD-I system, a CPU of the 68000 type (microprocessor of 16 bits developed by Motorola Inc.) is used and an operating system which is fundamentally based on widespread OS9 is used as a real-time operating system which handles various kinds of files. Two trigger buttons and an X-Y device are used as an input device. Two audio and video systems are prepared as an output system. The CD-I player is constructed so that it can reproduce ordinary compact disc for a music.

As mentioned above, in the CD-I system, it has been predetermined to use two trigger buttons and an X-Y device as an input device and all of the operations can be executed by using the two trigger buttons and the X-Y device at a minimum. In the input device having such limited keys, however, there is a limitation in improvement of the operability. Particularly, in the case of executing the audio reproduction by the CD-I system, it is demanded that the operations can be performed in conformity with those of the conventional compact disc player for musics.

OBJECTS AND SUMMARY OF THE INVENTION

It is, therefore, an object of the invention to provide a disc reproducing apparatus which can improve the operability in the case of reproducing a CD-I disc or a CD-I/CD-DA disc.

According to an aspect of the invention, there is provided a disc reproducing apparatus for reproducing a disc on which at least image data in addition to audio data have been recorded, comprising:

means for reproducing at least the digital image data recorded on the disc and decoding a video signal from the reproduced digital image data, display means, including a screen, for selectively displaying the video signal and operation key icons on the screen, operation key means for selectively inputting a plurality of control information signals, and control means, supplied with the control information signals, for controlling the display means and the means for reproducing in response to the control information signals and for causing the display means to display, while the video signal is displayed on the screen, a plurality of operation key icons on the screen which are representative of control operations corresponding to the control information signals whereby a user of the disc reproducing apparatus can select a control operation corresponding to one of the operation key icons by selective operation of the operation key means.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

An embodiment of the invention will be described in accordance with the following order.

a. Construction of an embodiment
b. With respect to a CD-I format
  b1. Data structure
  b2. Writing of audio data
  b3. Writing of video data
  b4. Disc
  b5. Hardware
c. Internal construction of an embodiment
d. Operation of an embodiment
e. Operation when display is unnecessary
f. Operations which are executed by displaying keys onto the screen a. Construction of an embodiment FIGS. 1A and 1B are diagrams showing a whole construction of a CD-I player to which the invention has been applied.

Figure 1A:
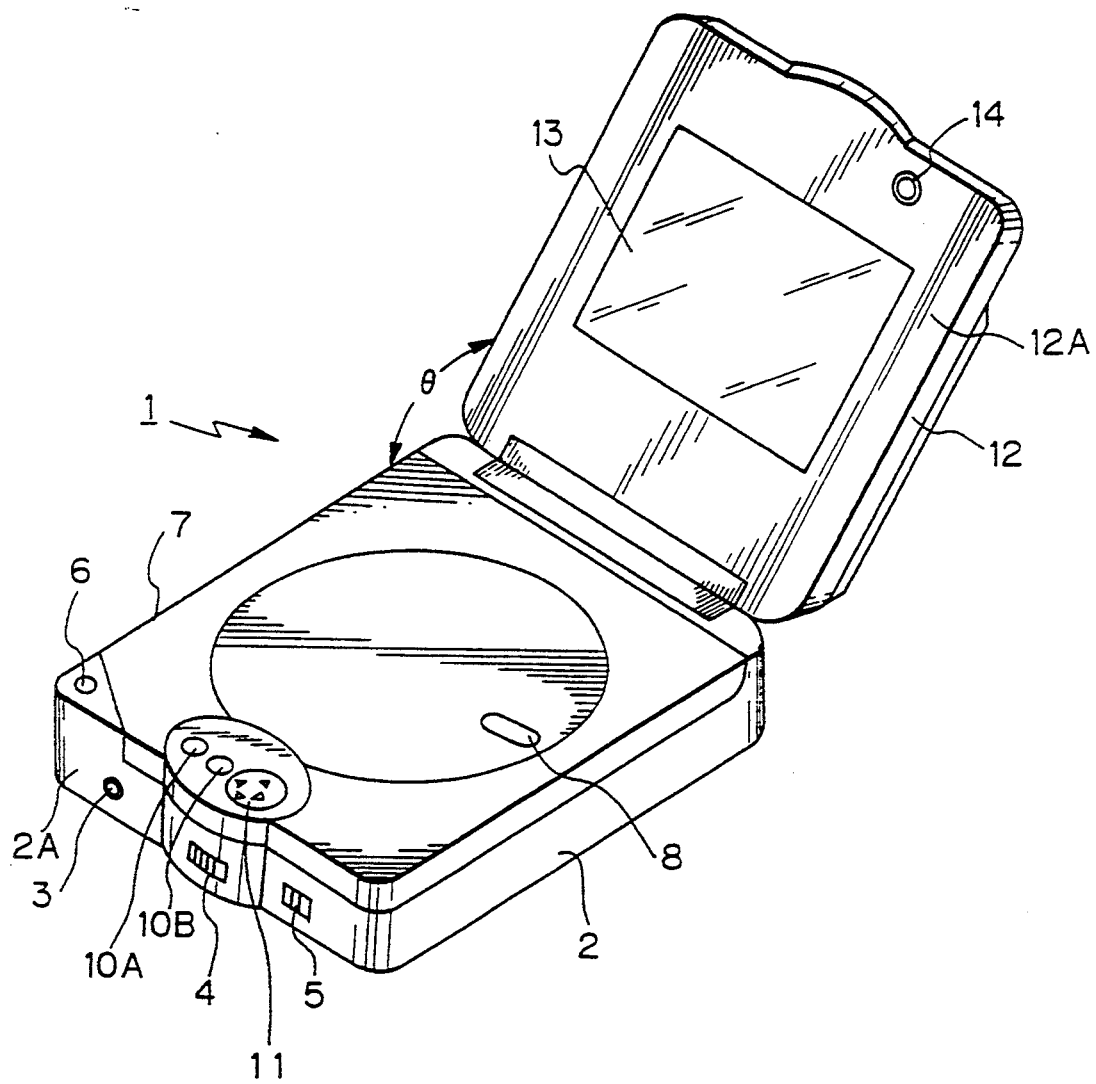
FIG. 1 is a perspective view showing a whole construction of an embodiment of the invention.
Figure 1B:
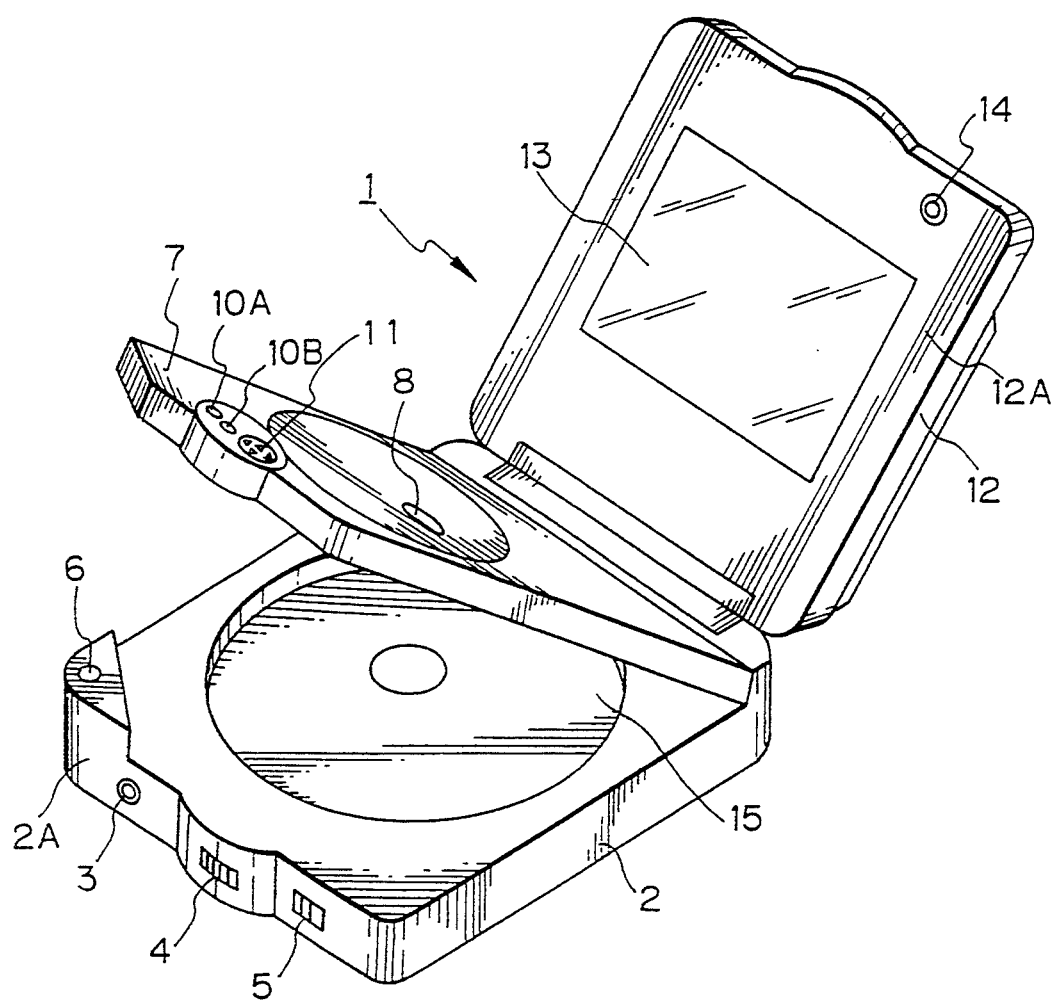

In FIGS. 1A and 1B, reference numeral 1 denotes a whole CD-I player to which the invention has been applied. In order to enable the CD-I player 1 to be easily carried to the outside an LCD display 13 is integrated and the size and weight of the CD-I player 1 are reduced by realizing an IC, using chip parts, and the like. Dimensions of the entire CD-I player 1 are set to, for instance, a width of 140 mm, a length of 170 mm, and a height of 60 mm.

A disc driving section to rotate the disc 15 which has been set, a head driving section to move the optical head in the radial direction of the disc, and a printed circuit board to process a reproduction signal from the optical head are enclosed in the casing of the player main body portion 2 of the CD-I player 1. Further, a computer comprising a CPU of the 68000 type is enclosed in the casing.

A head phones jack 3, a sound volume adjusting dial 4, and a power on/off switch 5 are arranged on a front side surface 2A of the player main body portion 2. An open button 6 is arranged on a front side upper edge of the player main body portion 2.

A middle cover 7 is rotatably arranged on the player main body portion 2 of the CD-I player 1. By depressing the open button 6, the middle cover 7 is opened as shown in FIG. 1B. When the middle cover 7 is opened, the disc can be loaded/unloaded. A window portion 8 is formed in the middle cover 7. A transparent member is used as a window portion 8. The rotating state of the loaded disc 15 can be checked through the window portion 8.

An X-Y device 11 and trigger buttons 10A and 10B are arranged on a front edge surface of the middle cover 7. The X-Y device 11 can designate positions in the X and Y directions by depressing portions which are deviated from the center in the vertical and horizontal direction, respectively.

A pointing device such as track ball, mouse, joy-stick, or the like can be used as such an X-Y device 11.

An outer cover 12 is rotatably arranged over the middle cover 7. The outer cover 12 can be manually opened. The outer cover 12 can be opened to an opening/closing angle of 90° or more, and fixed to predetermined opening/closing angle of $\theta$. The LCD display 13 of a size /f, e.g., 4 inches is arranged on a back surface 12A of the outer cover 12. By opening the outer cover 12, the LCD display 13 is exposed as shown in the figure, thereby enabling a picture plane of the LCD display 13 to be seen. An LCD driving switch 14 is also arranged on the back surface 12A of the outer cover 12. By operating the LCD driving switch 14, the LCD display 13 can be on/off controlled.

b. With respect to a CD-I format

The CD-I player to which the invention has been applied can reproduce a CD-I disc, a CD-I/CD-DA disc (disc in which a CD-I format and a CD-DA format mixedly exist), and a CD-DA disc (ordinary compact disc for reproducing a music) as discs. A data format of the CD-I will now be described.

b1. Data structure

The CD-I records data in a format which is fundamentally based on the CD-ROM. A recording unit of the data is set to a block in a manner similar to the CD-ROM. One block is set to 2352 bytes. In the case of the disc having a diameter of 12 cm, a recording capacity of the whole CD-I disc is equal to about 640 Mbytes.

There are two kinds of data structures of the CD-I of a form 1 and a form 2. They correspond to a mode 1 and a mode 2 of the CD-ROM, respectively.

In the mode 1 in the CD-ROM, an error detection code and an error correction code are added to the data of one block, thereby enabling a strong error correction to be executed. In the mode 2 in the CD-ROM, none of the error detection code and the error correction code is added, thereby enabling a large amount of user's data to be assured.

In the CD-I, the form 1 and the form 2 can be designated every block and both of the forms 1 and 2 can be allowed to mixedly exist in one disc.

The CD-I format differs from the CD-ROM format with respect to a point that a sub-header of eight bytes is provided at the head of the user's data. Each block in which audio data, image, and data have been recorded is time-sharingly multiplexed to the sub-header on a block unit basis, and they are written twice and stored to process in a real-time manner. The sub-header comprises four items of a file number, a channel number, a sub-mode, and a data type.

Figure 2A:
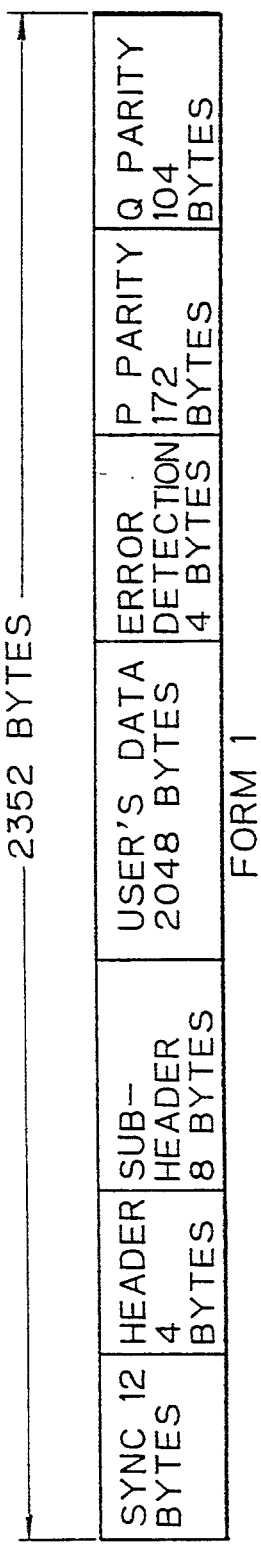
FIGS. 2 and 3 are schematic diagrams which are used in the explanation of the specifications of a CD-I.

That is, FIG. 2A shows a structure of the form 1. In the form 1, a sync (12 bytes) is provided at the head. A header (4 bytes) is subsequently provided. Further, a sub-header (8 bytes) is provided. After that, user's data (2048 bytes) is provided. An error detection code EDC (4 bytes) and a P parity (172 bytes) and a Q parity (104 bytes) for error correction are added to the user's data. In the form 1, the error correcting capability is enhanced. The form 1 is suitable in the case of handling data such as character data, program data, or the like whose errors cannot be interpolated.

Figure 2B:
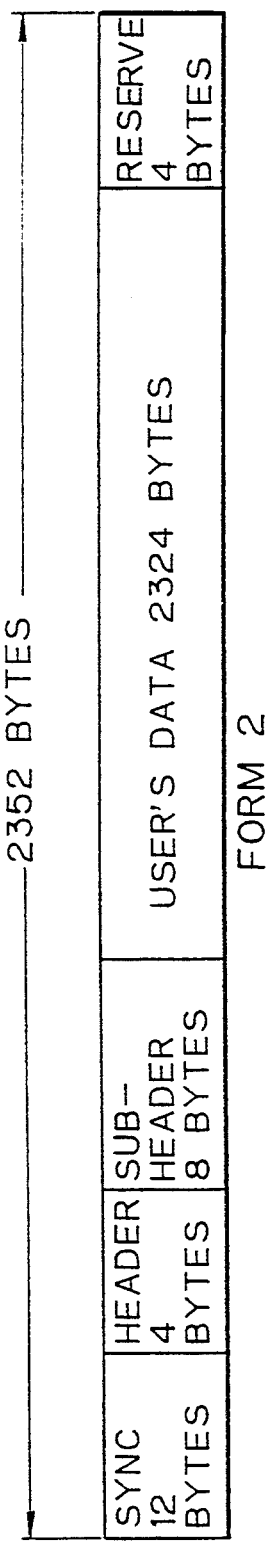

FIG. 2B shows a structure of the form 2. In the form 2, a sync (12 bytes) is provided at the head. A header (4 bytes) is subsequently provided. Further, a sub-header (8 bytes) is provided. After that, user's data (2324 bytes) is provided and a reserve area (4 bytes) is provided. The form 2 is suitable in the case of handling data such as audio data, video data, or the like which can be interpolated.

Figure 3:
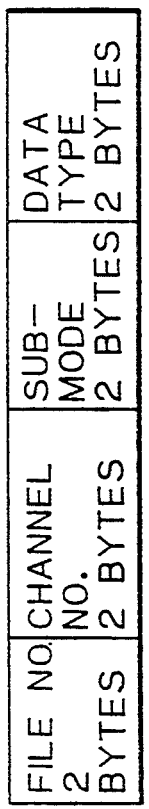

As shown in FIG. 3, the sub-header which is added to the head of the user's data comprises a file number (2 bytes), a channel number (2 bytes), a sub-mode (2 bytes), and a data type (2 bytes).

b2. Writing of audio data

Four modes are determined when audio data in CD-I is written.

One of the modes is based on the same recording system as that of the existing CD-DA in which the sampling frequency is set to 44.1 kHz and the number of quantization bits is set to 16 bits. This mode intends to perform a super Hi-Fi reproduction.

In another mode, an ADPCM (Adaptive Differential PCM) is used as a recording method. The sampling frequency is set to 37.8 kHz and the number of quantization bits is set to 8 bits. In this mode, a sound quality which is close to that of an LP record can be reproduced. The reproducing time is set to two hours in the stereophonic mode and is set to four hours in the monaural mode. This mode intends to perform a Hi-Fi reproduction.

In still another mode, the ADPCM is used as a recording method. The sampling frequency is set to 37.8 kHz and the number of quantization bits is set to 4 bits. In this mode, a sound quality which is close to that of an FM broadcasting can be reproduced. The reproducing time is set to four hours in the stereophonic mode and is set to eight hours in the monaural mode. This mode intends to perform a Hi-Fi reproduction of a long time.

In further another mode, the ADPCM is used as a recording method. The sampling frequency is set to 18.9 kHz and the number of quantization bits is set to 4 bits. The reproducing time is set to eight hours in the stereophonic mode and set to sixteen hours in the monaural mode. This mode intends to perform a speech reproduction.

b3. Writing of video data

Image data is processed as follows in accordance with the type of image data.

In the case of a natural image, the sampling frequency of a luminance signal Y is set to 7.6 MHz and the sampling frequencies of color difference signals U and V are set to 3.8 MHz. The image data is sampled at ratios of 4:2:2. Bits are compressed to four bits and recorded. They are returned to eight bits upon reproduction.

In the case of graphics, a CLUT (Color Lookup Table) is used. The CLUT graphics include three modes of 256 colors (8 bits), 128 colors (7 bits), and 16 colors (4 bits). Necessary colors can be selected from sixteen million colors and used.

In the case of an animation, a run length code is used. In this case, image data is compressed by using color information and a length between pixels. An animation on a full screen can be realized by using such a code.

b4. Disc

In the CD-I disc, mechanical dimensions such as outer diameter dimension, center hole dimension, thickness, and the like, optical parameters such as refractive index, reflectance, and the like, recording parameters such as disc rotating direction, recording linear velocity, track shape, track pitch, and the like, use environment situations, and the like are all similarly set those of an ordinary compact disc (CD-DA) for a music.

The disc is constructed in a manner such that it is possible to discriminate whether the disc is a CD-I disc or not on the basis of the contents in a TOC (Table of Contents) of a lead-in area of the disc. That is, in the CD-I disc or CD-I/CD-DA disc, a PSEC is set to 10 when (POINT=A0). On the other hand, in the other discs, the PSEC when (POINT=A0) is set to a value other than 10. For example, in the CD-DA disc, the PSEC when (POINT=A0) is set to 00. Therefore, from the PSEC when (POINT=A0), it is possible to judge whether the disc is a CD-I disc or a CD-I/CD-DA disc or another disc. Control fields of (POINT=A0, A1, A2) of the CD-I disc are set to (01×0). A control field of (POINT=A0) of the CD-I/CD-DA disc is always set to (01×0) and the other control fields are set to (00×0). Consequently, from the control field, it is possible to judge whether the disc is a CD-I disc or a CD-I/CD-DA disc.

b5. Hardware

In the CD-I, since audio data is included and a high-speed process in a real-time manner is needed, a process by a machine language is executed. As a CPU for such a purpose, a CPU of 16 bits of the 68000 type which has been developed by Motorola Inc. is designated. A CD-RTOS (Real-Time Operating System) which handles various kinds of files fundamentally uses the OS9 and the program is assembled as an ROM into the system. At least an X-Y device and two trigger buttons are prepared as an input device. Two systems of audio and video are prepared as an output. The CD-I player can reproduce a CD-DA for musics.

c. Internal construction of an embodiment

Figure 4:
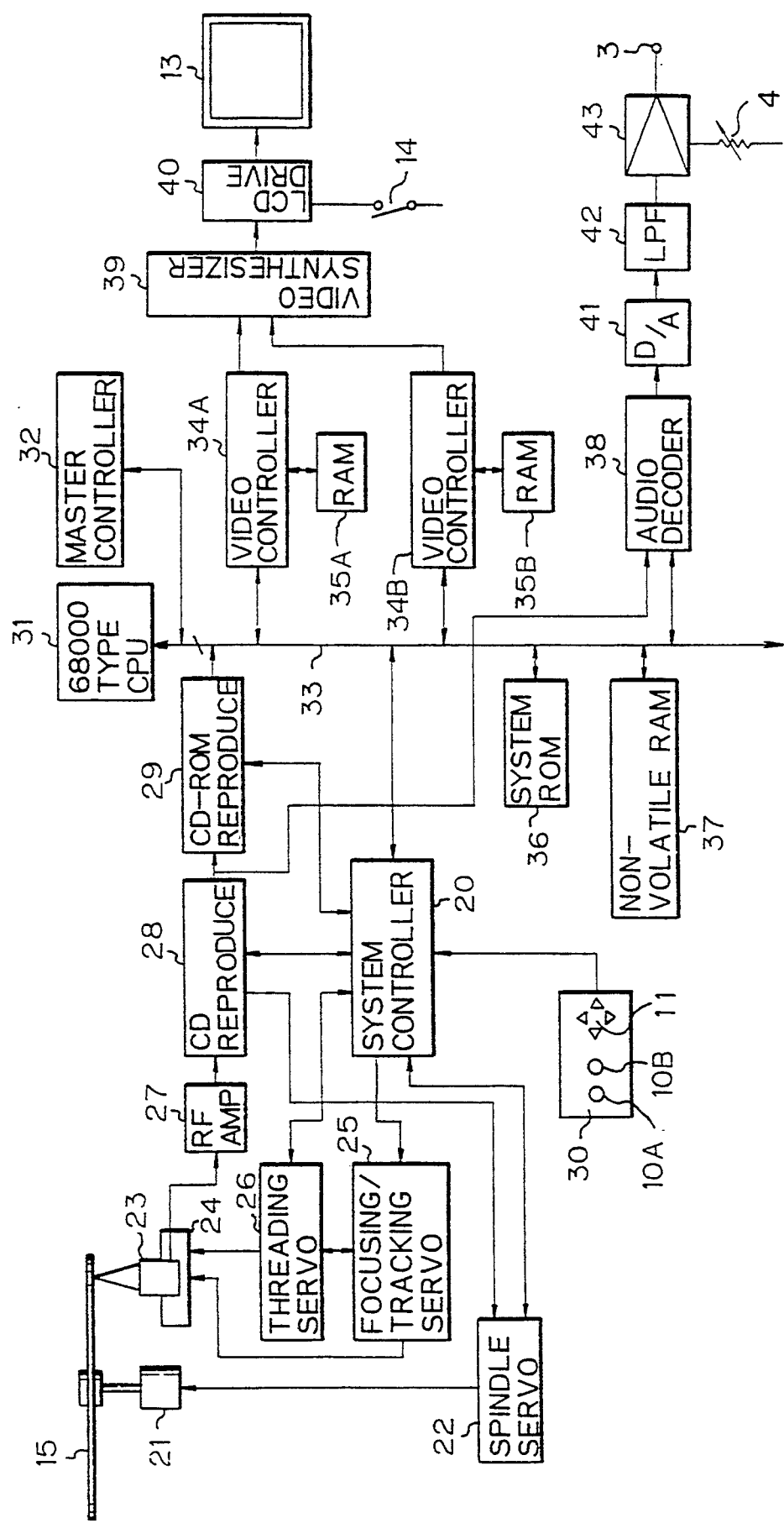
FIG. 4 is a block diagram showing an internal construction of the embodiment of the invention.

FIG. 4 shows an internal construction of the CD-I player 1 to which the invention has been applied.

In FIG. 4, a disc 15 is rotated by a spindle motor 21 at a CLV (constant linear velocity). The rotation of the spindle motor 21 is controlled by a spindle servo circuit 22 on the basis of clocks which are reproduced by a CD reproducing circuit 28. An output of a system controller 20 is supplied to the spindle servo circuit 22.

A recording signal on the disc 15 is reproduced by an optical head 23. The optical head 23 is supported by a biaxial device. An output of a focusing/tracking servo circuit 25 is supplied to the biaxial device. The output of the system controller 20 is supplied to the focusing/tracking servo circuit 25. The focusing/tracking servo circuit 25 applies servo controls to two axes for the optical head 23 in the focusing direction and the tracking direction on the basis of an output of a photo detector.

The optical head 23 is made movable in the radial direction of the disc 15 by a slide feeding mechanism 24 using, for instance, a linear motor. The slide feeding mechanism 24 is controlled by a threading servo circuit 26. The output of the system controller 20 is supplied to the threading servo circuit 26. The optical head 23 can be accessed to a desired track position by the slide feeding mechanism 24.

An output of the optical head 23 is supplied to a CD reproducing circuit 28 through an RF amplifier 27. The CD reproducing circuit 28 comprises a reproducing circuit of bit clocks, an EFM demodulating circuit, a CIRC error correction circuit, and the like. The CD reproducing circuit 28 EFM demodulates the output of the optical head 23 and executes an error correcting process. The CD reproducing circuit 28 is controlled by the system controller 20.

An output of the CD reproducing circuit 28 is supplied to a CD-ROM reproducing circuit 29. The CD-ROM reproducing circuit 29 comprises a sync detecting circuit, a descrambling circuit, an error correction circuit, and the like. A sync signal is detected by the CD-ROM reproducing circuit 29 and the scramble is released. A header address is checked and a target block is accessed. In the case of the form 1, the error correcting process is further executed. The CD-ROM reproducing circuit 29 is controlled by the system controller 29.

An input from an input device 30 is given to the system controller 20. The input device 30 comprises the X-Y device 11 and two trigger buttons 10A and 10B.

Reference numeral 31 denotes a CPU to control the CD-I system. A CPU of the 68000 type is used as a CPU 31. A master controller 32 is connected to the CPU 31. The CPU 31 and the system controller 20 are bidirectionally connected. A bus 33 is led out of the CPU 31. One chip in which the CPU 31 and the master controller 32 are assembled can be also used.

The data reproduced by the CD-ROM reproducing circuit 29 is sent to the bus 33. RAMs 35A and 35B are connected to the bus 33 through video controllers 34A and 34B, respectively. A system ROM 36 and a non-volatile RAM 37 which is backed up by batteries are bidirectionally connected to the bus 33. An audio decoder 38 is connected to the bus 33.

The image data in the data reproduced by the CD-ROM reproducing circuit 29 is supplied to video controllers 34A and 34B under control of the CPU 31. Video signals based on the image data are formed by the video controllers 34A and 34B. The video signals are supplied to a video synthesizer 39. The video synthesizer 39 synthesizes the video signal from the video controller 34A and the video signal from the video controller 34B. An output of the video synthesizer 39 is supplied to the LCD display 13 via an LCD driving circuit 40. The driving of the LCD display 13 can be turned on/off by the LCD driving switch 14.

The audio data in the data reproduced by the CD-ROM reproducing circuit 29 is supplied to the audio decoder 38 under control of the CPU 31. In the case of the audio data based on the ADPCM, the audio decoder 38 ADPCM decodes the audio data. The decoded audio data is supplied to the D/A converter 41 and is converted into the analog signal. The analog signal is generated from the head phones output terminal 3 through a low pass filter 42 and an amplifier 43. An audio signal level which is generated from the head phones output terminal 3 can be set by the sound volume adjusting dial 4.

d. Operation of an embodiment

Figure 5:
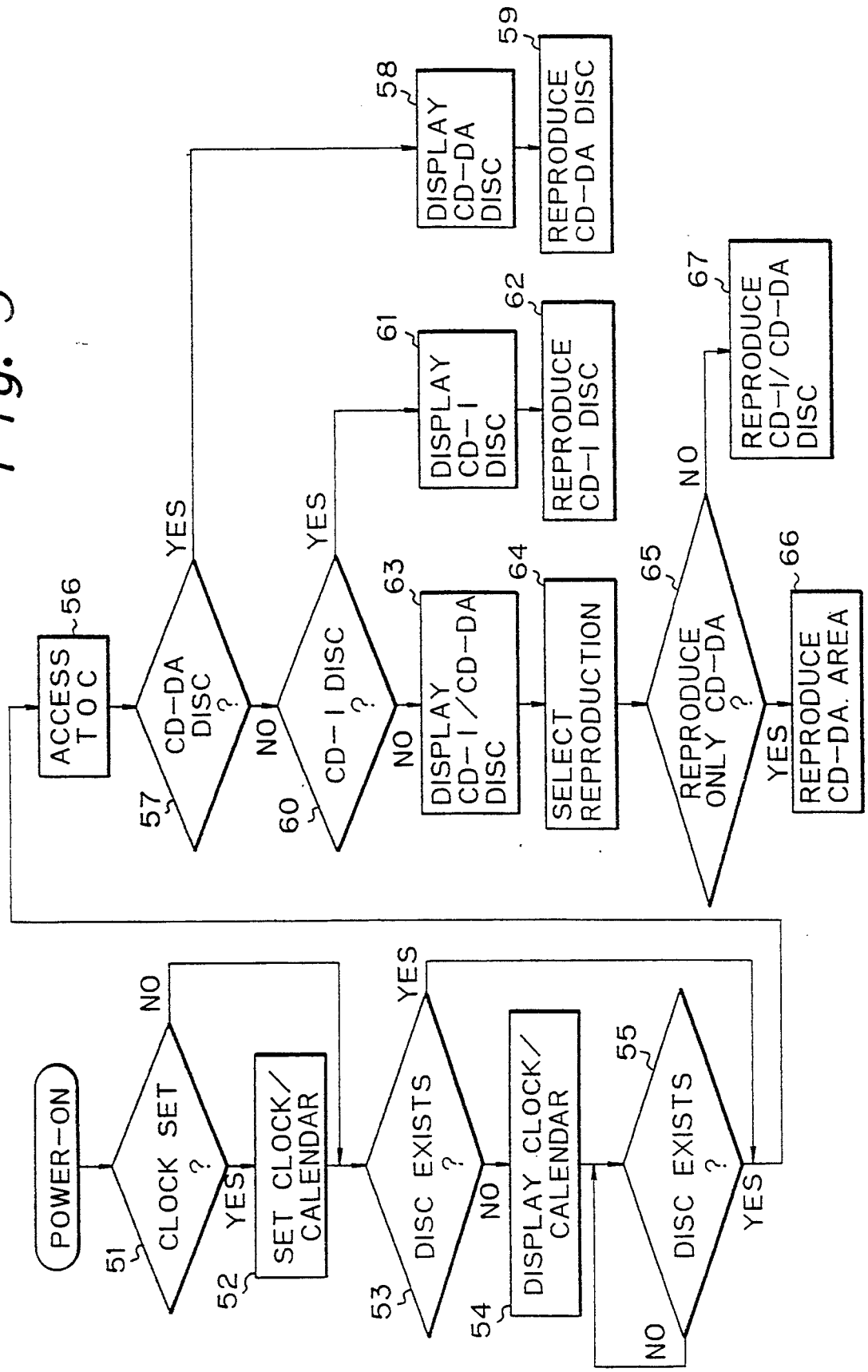
FIG. 5 is a flowchart which is used in the explanation of the operation of the embodiment of the invention.

The operation of an embodiment of the invention will now be described. FIG. 5 shows the operation when the LCD display 13 is turned on.

In FIG. 5, when the power source is turned on by the power on/off switch 5 (FIG. 1), a check is made to see if a calendar and an internal clock have been set or not (step 51).

In the case of setting the calendar and the internal clock, the calendar and the internal clock are set by using the X-Y device 11 and the trigger buttons 10A and 10B (step 52). After the calendar and the internal clock were set, a check is made to see if the disc has been loaded or not (step 53).

If the calendar and the internal clock are not set in step 51, step 53 follows and a check is made to see if the disc has been loaded or not.

Figure 6A:
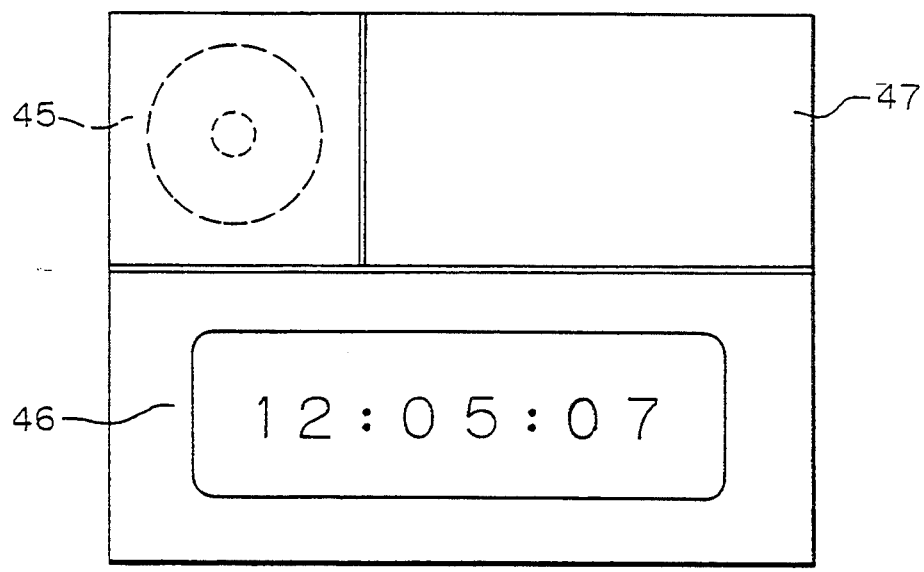
FIG. 6 is a schematic diagram which is used in the explanation of the indication of a display in the embodiment of the invention.

If the disc is not loaded, an indication of the unloaded state of the disc is displayed by the LCD display 13 (step 54). That is, if the disc is not loaded, as shown in FIG. 6A, an indication of the unloaded state of the disc is displayed in a display area 45 of the LCD display 13 and the calendar and the time are displayed in a display area 46.

The discrimination regarding the loading of the disc is continued (step 55).

If it is detected in step 53 or step 55 that the disc has been loaded, the TOC of the innermost rim of the disc is accessed (step 56).

From the data of the TOC, a check is first made to see if the loaded disc is a CD-I/CD-DA disc or a CD-I disc or a CD-DA disc (step 57). That is, in the case of the CD-I disc or CD-I/CD-DA disc, PSEC when (POINT=A0) is set to 10. In the case of another disc, since PSEC when (POINT=A0) has been set to 00, a check is made from the PSEC when (POINT=A0) to see if the disc is a CD-I disc or a CD-DA disc.

Figure 6B:
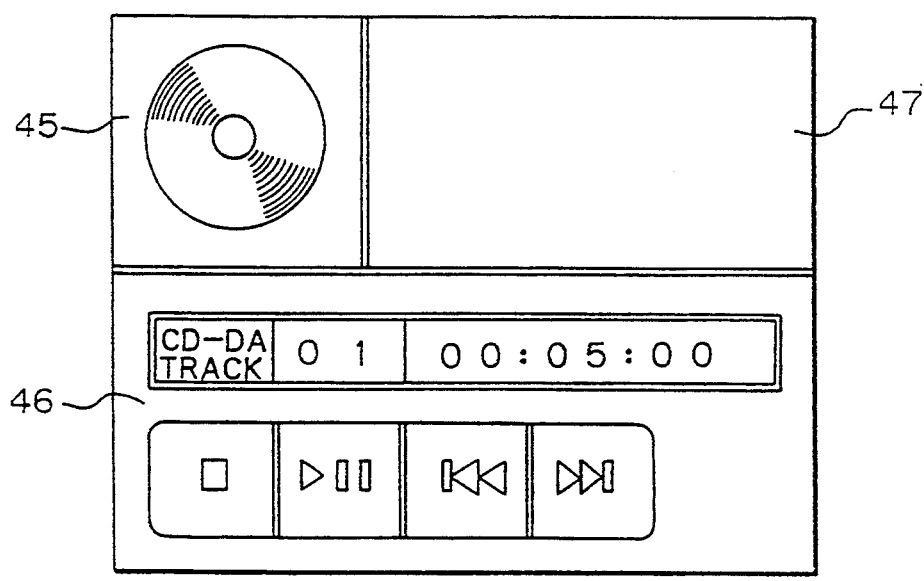

If it is decided that the disc is the CD-DA disc, an indication when the CD-DA disc has been loaded is displayed in the LCD display 13 (step 58). That is when the CD-DA disc has been loaded, as shown in FIG. 6B, a content indicating that the disc has been loaded is displayed in the display area 45 of the LCD display 13. An indication of an operation key such as PLAY, AMS, STOP, etc. to operate the CD-DA is displayed in the display area 46.

When the operation key displayed in the display area 46 is operated by using the X-Y device 11 and the trigger buttons 10A and 10B, the CD-DA disc is reproduced in accordance with the above operation (step 59).

If it is determined in step 57 that the disc is not the CD-DA disc, a check is made to see if the disc is a CD-I disc or a CD-I/CD-DA disc (step 60). Namely, control fields of (POINT=A0, A1, A2) of the CD-I disc are set to (01×0) and a control field of (POINT=A0) of the CD-I/CD-DA disc is always set to (01×0). The other control fields are set to (00×0). Therefore, from the control field, it is judged whether the disc is the CD-I disc or the CD-I/CD-DA disc.

Figure 6C:
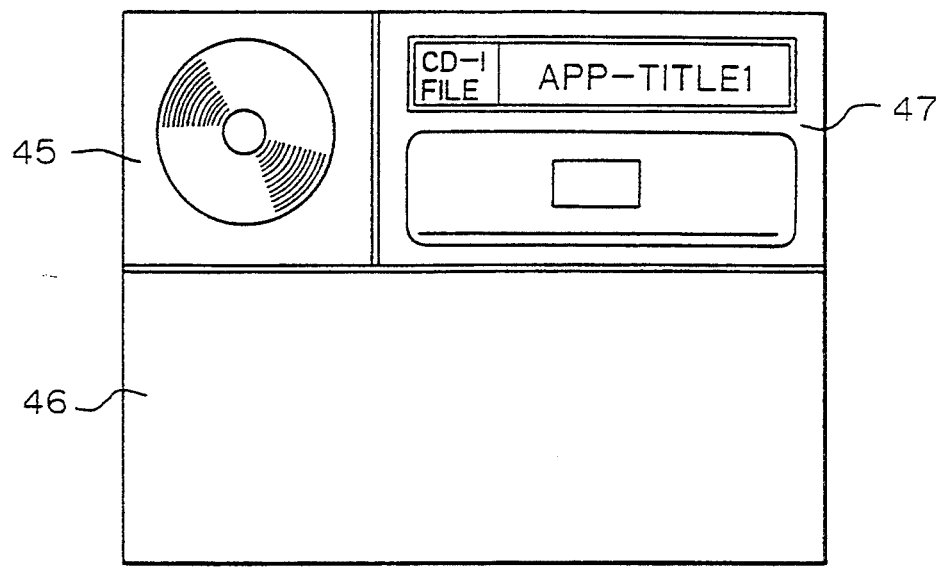

If it is determined that the loaded disc is the CD-I disc, an indication when the CD-I disc has been loaded is displayed on the LCD display 13 (step 61). That is, if the CD-I disc has been loaded, as shown in FIG. 6C, an indication showing that the disc has been loaded is displayed in the display area 45 of the LCD display 13. A title and the like of an application software are displayed in the display area 47.

When operating by using the X-Y device 11 and the trigger buttons 10A and 10B in accordance with an instruction of the application software, the CD-I disc is reproduced in accordance with the operation (step 62).

Figure 6D:
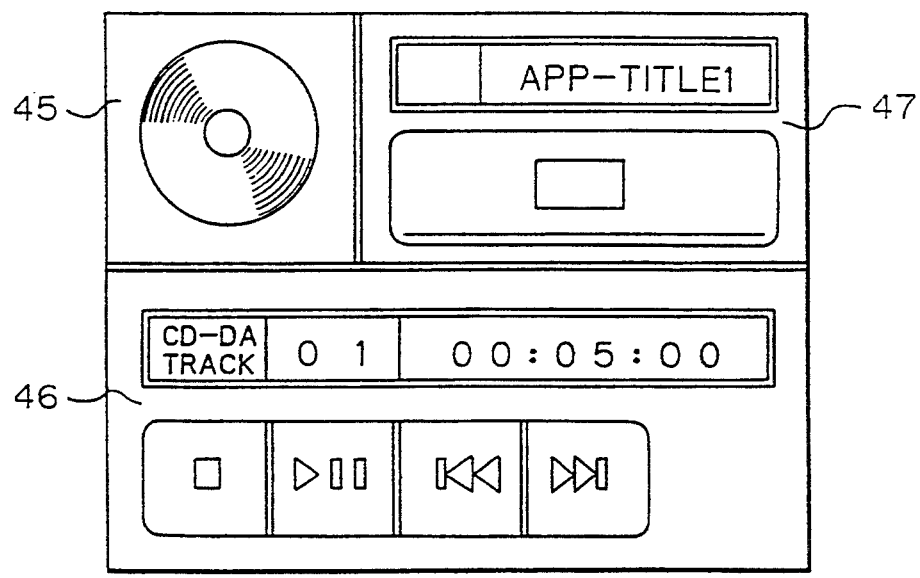

If it is decided that the loaded disc is the CD-I/CD-DA disc, an indication when the CD-I/CD-DA disc has been loaded is displayed on the LCD display 13 (step 64). That is, when the CD-I/CD-DA disc has been loaded, as shown in FIG. 6D, an indication showing that the disc has been loaded is displayed in the display area 45 of the LCD display 13. An indication, i.e. icon depicting an operation key such as PLAY, AMS, STOP, or the like to operate the CD-DA is displayed in the display area 46. The title and the like of the application software are displayed in a display area 47.

In the case of the CD-I/CD-DA disc, a check is made to see if only the CD-DA is reproduced or not (step 65). When the operation key icon displayed in the display area 46 is operated by using the X-Y device 11 and the trigger buttons 10A and 10B, only the portion of the CD-DA area is reproduced in accordance with the operation (step 66). When operating by using the X-Y device 11 and the trigger buttons 10A and 10B in accordance with the instruction of the application software, the CD-I/CD-DA is reproduced in accordance with the operation (step 67).

As mentioned above, according to an embodiment of the invention, in the case of the CD-I/CD-DA disc, only the CD-DA area can be reproduced. Thus, only the sounds of the application software can be enjoyed.

e. Operation when display is unnecessary

In the case of reproducing the CD-DA disc, only the audio data is reproduced, so that there is no need to display on the LCD display 13. In the case of reproducing only the audio data from the CD-I/CD-DA disc as well, there is no need to display on the LCD display 13. As mentioned above, if the LCD display 13 driven when the screen display is unnecessary, an electric power is vainly consumed. In the embodiment of the invention, therefore, when there is no need to display a screen, by enabling the LCD display 13 to be turned off by the LCD driving switch 14, the electric power consumption can be reduced.

If the LCD display 13 is turned off, however, it is impossible to execute the operation while looking at the indication on the LCD display 13. It is also possible to provide special keys for audio reproduction in addition to the X-Y device 11 and the trigger buttons 10A and 10B. However, if such keys are provided, the number of keys increases and the apparatus enlarges in size. In the embodiment of the invention, accordingly, the X-Y device 11 and the trigger buttons 10A and 10B are allowed to function as special keys for audio reproduction when the loaded disc is the CD-DA disc and the driving of the LCD display 13 has been turned off or when the loaded disc is the CD-DA disc and only the audio reproduction is executed and the driving of the LCD display 13 has been turned off. That is, for instance, the left direction and the right direction of the X-Y device 11 function as an "AMS key", the trigger button 10A functions as a "PLAY/PAUSE key", and the trigger button 10B functions as a "STOP key". Consequently, even when the driving of the LCD display 13 has been stopped, various audio reproducing operations can be freely executed.

Since the video reproduction is not performed in the CD-DA disc, it is also possible to construct in a manner such that if the CD-DA disc has been loaded, the X-Y device 11 and the trigger buttons 10A and 10B can be allowed to function as special keys for audio reproduction irrespective of the on/off of the LCD display 13. It is also possible to construct in a manner such that the X-Y device 11 and the trigger buttons 10A and 10B are allowed to function as special keys for audio reproduction irrespective of the kind of disc if the LCD display 13 has been turned off.

f. Operations which are executed by displaying keys onto the screen

In the CD-I, all of the operations can be executed by the two trigger buttons 10A and 10B and the X-Y device 11. However, there is a case where adequate operations cannot be performed by such two trigger buttons 10A and 10B and X-Y device 11. Accordingly, in the embodiment of the invention, operation key icons are displayed in the application picture plane and various operations can be executed.

Figure 7A:
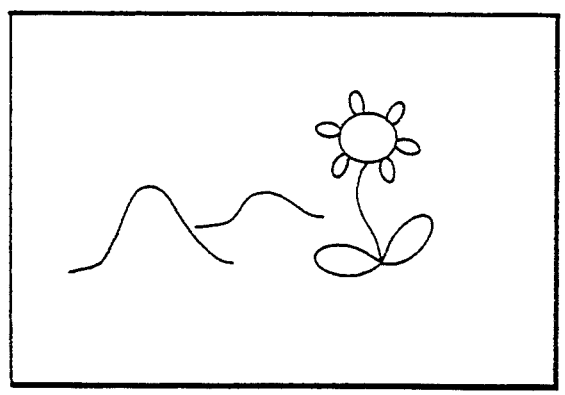
FIG. 7 is a perspective view which is used in the explanation of a conventional CD-I system.
Figure 7B:
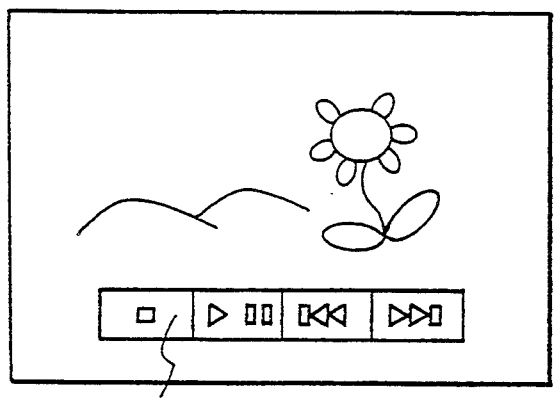

That is, as shown in FIG. 7A, when the trigger button 10A or 10B is pressed in a state in which the application picture plane is displayed, operation key icons 71 are displayed in the picture plane as shown in FIG. 7B. The operation key icons 71 are similar to the operation keys as PLAY, STOP, AMS, etc. which are provided for the compact disc for musics. By constructing the operation keys 71 in a manner similar to the operation keys provided for the compact disc for musics as mentioned above, the operations according to those of the compact disc for music can be executed and the operability is improved. The key arrangement, the shape of the keys, the functions of the keys be arbitrarily set in consideration of the operability. By operating, the operation i.e., activating key icons 71 displayed by using the X-Y device 11 and the trigger buttons 10A and 10B, various kinds of operations can be performed.

According to the invention, when the trigger button 10A or 10B is pressed in a state in which the application picture plane is displayed, the operation keys icons 71 are displayed in the picture plane. Various operations can be performed by operating the operation key icons 71 displayed by using the X-Y device 11 and the trigger buttons 10A and 10B. As mentioned above, by displaying the operation key icons 71 on the screen and by operating the operation key icons 71 by using the X-Y device 11 and the trigger buttons 10A and 10B, various kinds of operations can be executed by the limited number of X-Y device 11 and trigger buttons 10A and 10B and the operability is improved. By constructing the operation key icons 71 which are displayed in a manner similar to the operation keys provided for the compact disc for music, operations similar to those of the compact disc for music can be executed and the operability is improved.

What is claimed is:

1. An optical disc reproducing apparatus for reproducing an optical disc, the optical disc reproducing apparatus having a main body portion and comprising:
   optical disc reproducing means for reproducing an optical disc on which only audio digital information is recorded or an optical disc on which video information is recorded alone or in addition to the audio information, the reproducing means including means for decoding the video information into a video signal;
   disc discriminating means connected to the optical disc reproducing means for discriminating a type of the optical disc being reproduced by the optical disc reproducing means, that is whether the optical disc is an optical disc on which only audio digital information is recorded or an optical disc on which video information is recorded alone or in addition to the audio information;
   display means, including a screen hinged to the main body portion, for selectively displaying the video signal and operation key icons on the screen simultaneously;
   display controlling means for changing the display on the display means depending on the type of the optical disc designated by a discriminating output of the disc discriminating means;
   operation key means, including a plurality of operation keys mounted on the main body portion of the disc reproducing apparatus, for selectively inputting a plurality of control information signals; and
   control means, supplied with the control information signals and the discriminating output of the disc discriminating means for controlling the means for reproducing to respond to the control information signals and for causing the display means to display simultaneously with the video signal different pluralities of operation key icons, depending upon the type of optical disc being reproduced, the icons being representative of control operations corresponding to the control information signals whereby a user of the disc reproducing apparatus can select a control operation corresponding to one of the operation key icons by selective operation of the operation key means.

2. An apparatus according to claim 1, wherein the operation key means comprises an X-Y input device and two trigger buttons, and the display means comprises a liquid crystal display on which is displayed the video signal by operating the X-Y device and the two trigger buttons.

3. An apparatus according to claim 1, wherein the control means con, rises means for displaying the operation key icons in a peripheral portion on the screen, and for changing display portions on the screen of the operation key icons displayed on the screen.

4. An apparatus according to claim 1, further comprises audio reproducing means for reproducing an audio signal on the basis of the digital audio data on disc, and the control means controls the audio reproducing means in response to the control information signals from the operation key means when the video signal is not displayed on the screen.

5. An apparatus according to claim 4, wherein the operation key icons displayed on the screen are similar in appearance to conventional manually operated "PLAY", "STOP", and "AMS" keys.

6. An apparatus according to claim 1, wherein, prior to any actuation of the operation keys, the control means causes the display means to display the decoded video signal but not the operation key icons and wherein, after the operation of one of the operation keys, the control means causes the display means to simultaneously display the decoded video signal and the operation key icons.

* * * * *